(12) United States Patent
Smith et al.

(10) Patent No.: US 9,064,022 B2
(45) Date of Patent: Jun. 23, 2015

(54) COMPONENT IDENTIFICATION AND TRACKING SYSTEM FOR TELECOMMUNICATION NETWORKS

(75) Inventors: Trevor D. Smith, Eden Priarie, MN (US); Danny Ghislain Thijs, Zonhoven (BE); Didier Claeys, Schaffen (BE); Heidi Bleus, Genk (BE)

(73) Assignees: ADC Telecommunications, Inc., Berwyn, PA (US); Tyco Electronics Raychem BVBA, Kessel-Lo (BE)

( * ) Notice: Subject to any disclaimer, the term of this patent is extended or adjusted under 35 U.S.C. 154(b) by 0 days.

(21) Appl. No.: 14/116,666

(22) PCT Filed: May 16, 2012

(86) PCT No.: PCT/US2012/038152
§ 371 (c)(1),
(2), (4) Date: Nov. 8, 2013

(87) PCT Pub. No.: WO2012/158806
PCT Pub. Date: Nov. 22, 2012

(65) Prior Publication Data
US 2014/0061297 A1    Mar. 6, 2014

Related U.S. Application Data

(60) Provisional application No. 61/487,178, filed on May 17, 2011, provisional application No. 61/591,576, filed on Jan. 27, 2012.

(51) Int. Cl.
*G06F 17/00* (2006.01)
(Continued)

(52) U.S. Cl.
CPC .......... *G06F 17/30879* (2013.01); *H04Q 1/136* (2013.01); *H04L 41/0253* (2013.01); *H04L 41/12* (2013.01); *G06F 17/30876* (2013.01)

(58) Field of Classification Search
CPC .......... G06Q 10/0833; G06K 9/00442; G06K 9/6202; G09F 3/0297; G06F 17/30879; G06F 17/30876; H04L 2209/805; H04W 4/008; G01J 3/0262; G01J 3/18; G01J 3/2803
USPC ............ 235/375, 451, 492, 462.01; 340/10.1, 340/572.1, 572.2
See application file for complete search history.

(56) References Cited

U.S. PATENT DOCUMENTS
3,243,761 A    3/1966 Piorunneck
(Continued)

FOREIGN PATENT DOCUMENTS
CA    2 499 803    4/2004
(Continued)

OTHER PUBLICATIONS

Avaya's Enhanced SYSTIMAX® iPatch System Enables IT Managers to Optimise Network Efficiency and Cut Downtime, Press Release, May 20, 2003, obtained from http://www.avaya.com/usa/about-avaya/newsroom/news-releases/2003/pr-030520 on Jan. 7, 2009.

(Continued)

*Primary Examiner* — Tuyen K Vo
(74) *Attorney, Agent, or Firm* — Merchant & Gould P.C.

(57) ABSTRACT

Identification elements (e.g., tracking elements, tracing elements, locating elements, etc.) (22A, 100) are provided on various communication components (20, 24, 26, 28, 30, 32, 34, 35, 36, 40, 42, 48, 49, 60, 62, 64, 120) provided within a communication network such as a fiber optic network or a copper network. Fiber optic hubs 20 can be identified and/or managed. Data centers (110) with patch panels (120) can also be identified and/or managed. Example passive identification elements include bar codes (e.g., 2d barcodes) and radio frequency identification (RFID) tags. In certain embodiments, RFID tags and the bar codes can include network information included therein. In certain embodiments, bar codes can be used to direct technicians to network links at which additional information stored elsewhere is provided. In certain embodiments, identification elements can be provided on communication components through an application downloaded to a mobile device by scanning the bar code. Such application on the mobile device can then be used to manage the network connections, change the network connections, or check the status of the network connections. Multiple mobile devices can be used and synchronized together with a central application, website or network. One example bar code useful for reading information from a network device and linking to a management application is a QR code (100).

16 Claims, 4 Drawing Sheets

(51) Int. Cl.

| | | |
|---|---|---|
| G06K 7/08 | (2006.01) | |
| G06K 7/10 | (2006.01) | |
| G06F 17/30 | (2006.01) | |
| H04Q 1/02 | (2006.01) | |
| H04L 12/24 | (2006.01) | |

(56) References Cited

U.S. PATENT DOCUMENTS

| | | |
|---|---|---|
| RE26,692 E | 10/1969 | Ruehlemann |
| 3,954,320 A | 5/1976 | Hardesty |
| 4,127,317 A | 11/1978 | Tyree |
| 4,679,879 A | 7/1987 | Triner et al. |
| 4,684,245 A | 8/1987 | Goldring |
| 4,737,120 A | 4/1988 | Grabbe et al. |
| 4,953,194 A | 8/1990 | Hansen et al. |
| 4,968,929 A | 11/1990 | Hauck et al. |
| 4,978,310 A | 12/1990 | Shichida |
| 5,041,005 A | 8/1991 | McHugh |
| 5,052,940 A | 10/1991 | Bengal |
| 5,064,381 A | 11/1991 | Lin |
| 5,107,532 A | 4/1992 | Hansen et al. |
| 5,161,988 A | 11/1992 | Krupka |
| 5,166,970 A | 11/1992 | Ward |
| 5,199,895 A | 4/1993 | Chang |
| 5,222,164 A | 6/1993 | Bass, Sr. et al. |
| 5,265,187 A | 11/1993 | Morin et al. |
| 5,305,405 A | 4/1994 | Emmons et al. |
| 5,353,367 A | 10/1994 | Czosnowski et al. |
| 5,393,249 A | 2/1995 | Morgenstern et al. |
| 5,394,503 A | 2/1995 | Dietz, Jr. et al. |
| 5,413,494 A | 5/1995 | Dewey et al. |
| 5,415,570 A | 5/1995 | Sarkissian |
| 5,418,334 A | 5/1995 | Williams |
| 5,419,717 A | 5/1995 | Abendschein et al. |
| 5,448,675 A | 9/1995 | Leone et al. |
| 5,467,062 A | 11/1995 | Burroughs et al. |
| 5,470,251 A | 11/1995 | Sano |
| 5,473,715 A | 12/1995 | Schofield et al. |
| 5,483,467 A | 1/1996 | Krupka et al. |
| 5,579,425 A | 11/1996 | Lampert et al. |
| 5,660,567 A | 8/1997 | Nierlich et al. |
| 5,674,085 A | 10/1997 | Davis et al. |
| 5,685,741 A | 11/1997 | Dewey et al. |
| 5,712,942 A | 1/1998 | Jennings et al. |
| 5,764,043 A | 6/1998 | Czosnowski et al. |
| 5,800,192 A | 9/1998 | David et al. |
| 5,821,510 A | 10/1998 | Cahen et al. |
| 5,854,824 A | 12/1998 | Bengal et al. |
| 5,871,368 A | 2/1999 | Erdner et al. |
| 5,910,776 A | 6/1999 | Black |
| 6,002,331 A | 12/1999 | Laor |
| 6,079,996 A | 6/2000 | Arnett |
| 6,095,837 A | 8/2000 | David et al. |
| 6,095,851 A | 8/2000 | Laity et al. |
| 6,116,961 A | 9/2000 | Henneberger et al. |
| 6,222,908 B1 | 4/2001 | Bartolutti et al. |
| 6,222,975 B1 | 4/2001 | Gilbert et al. |
| 6,227,911 B1 | 5/2001 | Boutros et al. |
| 6,234,830 B1 | 5/2001 | Ensz et al. |
| 6,238,235 B1 | 5/2001 | Shavit et al. |
| 6,280,231 B1 | 8/2001 | Nicholls |
| 6,285,293 B1 | 9/2001 | German et al. |
| 6,300,877 B1 | 10/2001 | Schannach et al. |
| 6,330,148 B1 | 12/2001 | Won et al. |
| 6,330,307 B1 | 12/2001 | Bloch et al. |
| 6,350,148 B1 | 2/2002 | Bartolutti et al. |
| 6,364,694 B1 | 4/2002 | Lien |
| 6,409,392 B1 | 6/2002 | Lampert et al. |
| 6,421,322 B1 | 7/2002 | Koziy et al. |
| 6,422,895 B1 | 7/2002 | Lien |
| 6,424,710 B1 | 7/2002 | Bartolutti et al. |
| 6,437,894 B1 | 8/2002 | Gilbert et al. |
| 6,456,768 B1 | 9/2002 | Boncek et al. |
| D466,479 S | 12/2002 | Pein et al. |
| 6,499,861 B1 | 12/2002 | German et al. |
| 6,511,231 B2 | 1/2003 | Lampert et al. |
| 6,522,737 B1 | 2/2003 | Bartolutti et al. |
| 6,554,484 B2 | 4/2003 | Lampert |
| 6,574,586 B1 | 6/2003 | David et al. |
| 6,612,856 B1 | 9/2003 | McCormack |
| 6,626,697 B1 | 9/2003 | Martin et al. |
| 6,636,152 B2 | 10/2003 | Schannach et al. |
| 6,684,179 B1 | 1/2004 | David |
| 6,725,177 B2 | 4/2004 | David et al. |
| 6,743,044 B2 | 6/2004 | Musolf et al. |
| 6,793,408 B2 | 9/2004 | Levy et al. |
| 6,802,735 B2 | 10/2004 | Pepe et al. |
| 6,808,116 B1 | 10/2004 | Eslambolchi et al. |
| 6,811,446 B1 | 11/2004 | Chang |
| 6,814,624 B2 | 11/2004 | Clark et al. |
| 6,847,856 B1 | 1/2005 | Bohannon |
| 6,850,685 B2 | 2/2005 | Tinucci et al. |
| 6,890,197 B2 | 5/2005 | Liebenow |
| 6,898,368 B2 | 5/2005 | Colombo et al. |
| 6,905,363 B2 | 6/2005 | Musolf et al. |
| 6,932,517 B2 | 8/2005 | Swayze et al. |
| D510,068 S | 9/2005 | Haggay et al. |
| 6,939,168 B2 | 9/2005 | Oleynick et al. |
| 6,961,675 B2 | 11/2005 | David |
| 6,968,994 B1 | 11/2005 | Ashwood |
| 6,971,895 B2 | 12/2005 | Sago et al. |
| 6,976,867 B2 | 12/2005 | Navarro et al. |
| 7,077,710 B2 | 7/2006 | Haggay et al. |
| 7,081,808 B2 | 7/2006 | Colombo et al. |
| 7,088,880 B1 | 8/2006 | Gershman |
| 7,112,090 B2 | 9/2006 | Caveney et al. |
| 7,123,810 B2 | 10/2006 | Parrish |
| 7,153,142 B2 | 12/2006 | Shifris et al. |
| 7,165,728 B2 | 1/2007 | Durrant et al. |
| 7,193,422 B2 | 3/2007 | Velleca et al. |
| 7,207,819 B2 | 4/2007 | Chen |
| 7,210,858 B2 | 5/2007 | Sago et al |
| 7,226,217 B1 | 6/2007 | Benton et al. |
| 7,234,944 B2 | 6/2007 | Nordin et al. |
| 7,241,157 B2 | 7/2007 | Zhuang et al. |
| 7,297,018 B2 | 11/2007 | Caveney et al. |
| 7,312,715 B2 | 12/2007 | Shalts et al. |
| D559,186 S | 1/2008 | Kelmer |
| 7,315,224 B2 | 1/2008 | Gurovich et al. |
| 7,352,285 B2 | 4/2008 | Sakama et al. |
| 7,352,289 B1 | 4/2008 | Harris |
| 7,356,208 B2 | 4/2008 | Becker |
| 7,370,106 B2 | 5/2008 | Caveney |
| 7,374,101 B2 | 5/2008 | Kaneko |
| 7,384,300 B1 | 6/2008 | Salgado et al. |
| 7,396,245 B2 | 7/2008 | Huang et al. |
| 7,458,517 B2 | 12/2008 | Durrant et al. |
| 7,479,032 B2 | 1/2009 | Hoath et al. |
| 7,481,681 B2 | 1/2009 | Caveney et al. |
| 7,497,709 B1 | 3/2009 | Zhang |
| 7,519,000 B2 | 4/2009 | Caveney et al. |
| 7,534,137 B2 | 5/2009 | Caveney et al. |
| 7,552,872 B2 | 6/2009 | Tokita et al. |
| 7,559,805 B1 | 7/2009 | Yi et al. |
| 7,563,116 B2 | 7/2009 | Wang |
| 7,570,861 B2 | 8/2009 | Smrha et al. |
| 7,575,454 B1 | 8/2009 | Aoki et al. |
| 7,588,470 B2 | 9/2009 | Li et al. |
| 7,591,667 B2 | 9/2009 | Gatnau Navarro et al. |
| 7,605,707 B2 | 10/2009 | German et al. |
| 7,607,926 B2 | 10/2009 | Wang |
| 7,635,280 B1 | 12/2009 | Crumlin et al. |
| 7,648,377 B2 | 1/2010 | Naito et al. |
| 7,682,174 B2 | 3/2010 | Chen |
| 7,722,370 B2 | 5/2010 | Chin |
| 7,727,026 B2 | 6/2010 | Qin et al. |
| 7,753,717 B2 | 7/2010 | Belopolsky et al. |
| 7,785,154 B2 | 8/2010 | Peng |
| 7,798,832 B2 | 9/2010 | Qin et al. |
| 7,811,119 B2 | 10/2010 | Caveney et al. |
| 7,814,240 B2 | 10/2010 | Salgado et al. |
| 7,867,017 B1 | 1/2011 | Chen |

(56) References Cited

U.S. PATENT DOCUMENTS

| | | | |
|---|---|---|---|
| 7,869,426 | B2 | 1/2011 | Hough et al. |
| 7,872,738 | B2 | 1/2011 | Abbott |
| 7,880,475 | B2 | 2/2011 | Crumlin et al. |
| 8,157,582 | B2 | 4/2012 | Frey et al. |
| 8,272,892 | B2 | 9/2012 | McNeely et al. |
| 8,282,425 | B2 | 10/2012 | Bopp et al. |
| 8,287,316 | B2 | 10/2012 | Pepe et al. |
| 8,447,510 | B2 * | 5/2013 | Fitzpatrick et al. ........... 701/302 |
| 8,449,318 | B2 | 5/2013 | Beller et al. |
| 2002/0008613 | A1 | 1/2002 | Nathan et al. |
| 2002/0081076 | A1 | 6/2002 | Lampert et al. |
| 2004/0052471 | A1 | 3/2004 | Colombo et al. |
| 2004/0052498 | A1 | 3/2004 | Colombo et al. |
| 2004/0117515 | A1 | 6/2004 | Sago et al. |
| 2004/0240807 | A1 | 12/2004 | Frohlich et al. |
| 2005/0249477 | A1 | 11/2005 | Parrish |
| 2006/0148279 | A1 * | 7/2006 | German et al. ................. 439/49 |
| 2006/0160395 | A1 | 7/2006 | Macauley et al. |
| 2006/0193591 | A1 | 8/2006 | Rapp et al. |
| 2006/0228086 | A1 | 10/2006 | Holmberg et al. |
| 2007/0116411 | A1 | 5/2007 | Benton et al. |
| 2007/0176745 | A1 | 8/2007 | Gibson et al. |
| 2007/0237470 | A1 | 10/2007 | Aronson et al. |
| 2007/0254529 | A1 | 11/2007 | Pepe et al. |
| 2008/0090450 | A1 | 4/2008 | Harano et al. |
| 2008/0090454 | A1 | 4/2008 | Hoath et al. |
| 2008/0100456 | A1 | 5/2008 | Downie et al. |
| 2008/0100467 | A1 | 5/2008 | Downie et al. |
| 2008/0175532 | A1 | 7/2008 | Ruckstuhl et al. |
| 2008/0175550 | A1 | 7/2008 | Coburn et al. |
| 2008/0200160 | A1 * | 8/2008 | Fitzpatrick et al. ........... 455/418 |
| 2008/0250122 | A1 | 10/2008 | Zsigmond et al. |
| 2009/0034911 | A1 | 2/2009 | Murano |
| 2009/0097846 | A1 | 4/2009 | Kozischek et al. |
| 2009/0098763 | A1 | 4/2009 | Below et al. |
| 2009/0166404 | A1 | 7/2009 | German et al. |
| 2009/0195363 | A1 | 8/2009 | Downie et al. |
| 2009/0215310 | A1 | 8/2009 | Hoath et al. |
| 2009/0232455 | A1 | 9/2009 | Nhep |
| 2009/0262382 | A1 | 10/2009 | Nobutani |
| 2010/0048064 | A1 | 2/2010 | Peng |
| 2010/0210135 | A1 | 8/2010 | German et al. |
| 2010/0211664 | A1 | 8/2010 | Raza et al. |
| 2010/0211665 | A1 | 8/2010 | Raza et al. |
| 2010/0211697 | A1 | 8/2010 | Raza et al. |
| 2010/0215049 | A1 | 8/2010 | Raza et al. |
| 2010/0303421 | A1 | 12/2010 | He et al. |
| 2011/0092100 | A1 | 4/2011 | Coffey et al. |
| 2011/0262077 | A1 | 10/2011 | Anderson et al. |
| 2012/0003877 | A1 | 1/2012 | Bareel et al. |
| 2012/0021636 | A1 | 1/2012 | Debenedoctos et al. |
| 2012/0208401 | A1 | 8/2012 | Petersen |

FOREIGN PATENT DOCUMENTS

| | | |
|---|---|---|
| DE | 102 44 304 | 3/2004 |
| DE | 10 2004 033 940 A1 | 2/2006 |
| EP | 1 199 586 A2 | 4/2002 |
| EP | 1 237 024 A1 | 9/2002 |
| EP | 1 467 232 A1 | 10/2004 |
| EP | 1 662 287 A1 | 5/2006 |
| GB | 2 236 398 A | 4/1991 |
| GB | 2 393 549 A | 3/2004 |
| KR | 10-2008-0015345 | 2/2008 |
| WO | WO 00/65696 | 11/2000 |
| WO | WO 02/47215 A1 | 6/2002 |
| WO | WO 2007/061490 A2 | 5/2007 |
| WO | WO 2010/001400 A1 | 1/2010 |
| WO | WO 2010/081186 A1 | 7/2010 |
| WO | WO 2010/121639 A1 | 10/2010 |

OTHER PUBLICATIONS

*Avaya's Enhanced SYSTIMAX® iPatch System Enables IT Managers to Optimise Network Efficiency and Cut Downtime*, Press Release, May 9, 2003, obtained from http://www.avaya.com/usa/about-avaya/newsroom/news-releases/2003/pr-030509 on Jan. 7, 2009.
*Intelligent patching systems carving out a 'large' niche*, Cabling Installation & Maintenance, vol. 12, Issue 7, Jul. 2004 (5 pages).
*IntelliMAC: The intelligent way to make Moves, Adds or Changes!* NORDX/CDT © 2003 (6 pages).
International Search Report and Written Opinion for PCT/US2010/052872 mailed Jan. 12, 2011 (11 pages).
International Search Report and Written Opinion for PCT/US2010/053228 mailed Mar. 28, 2011 (26 pages).
International Search Report and Written Opinion mailed May 23, 2011 in related Application No. PCT/US2011/024650 (17 pages).
International Search Report and Written Opinion mailed Sep. 12, 2011 in related Application No. PCT/US2011/024652 (28 pages).
International Search Report and Written Opinion mailed Sep. 19, 2011 in related Application No. PCT/US2011/024649 (27 pages).
International Search Report and Written Opinion mailed Sep. 22, 2011 in related Application No. PCT/US2011/024653 (25 pages).
International Search Report for International Application No. PCT/US2012/038152 mailed Jan. 2, 2013 (3 pages).
Invitation to Pay Additional Fees with Partial International Search for PCT/US2012/053228 mailed Feb. 14, 2011 (9 pages).
iTRACS Physical Layer Manager FAQ, obtained on Jun. 11, 2008 from http://www.itracs.com/products/physical-layer-manager-faqs.mtml (6pages).
Meredith, L., "Managers missing point of intelligent patching," *Daa Center News*, Jun. 21, 2005, obtained Dec. 2, 2008 from http://searchdatacenter.techtarget.com/news/article/0,289142,sid80_gci1099991,00.html.
Ohtsuki, F. et al., "Design of Optical Connectors with ID Modules," *Electronics and Communications in Japan*, Part 1, vol. 77, No. 2, pp. 94-105 (Feb. 1994).
Partial International Search and Invitation to Pay Additional Fees mailed Jun. 8, 2011 in related Application No. PCT/US2011/024649 (8 pages).
Partial International Search and Invitation to Pay Additional Fees mailed Jun. 16, 2011 in related Application No. PCT/US2011/024652 (9 pages).
Partial International Search Report and Invitation to Pay Additional Fees mailed May 19, 2011 in related Application No. PCT/US2011/024653 (6 pages).
*SYSTIMAX® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.
TrueNet; TFP Series Rack Mount Fiber Panels, Spec Sheet; May 2008; 8 pages.
European Search Report for Application No. 12785141.8 mailed Nov. 6, 2014.
How to scan QR codes to download Android apps, http://mobiputing.com/2010/04/how-to-scan-qr-codes-to-download-android-apps/, 5 pages (Apr. 2010).

* cited by examiner

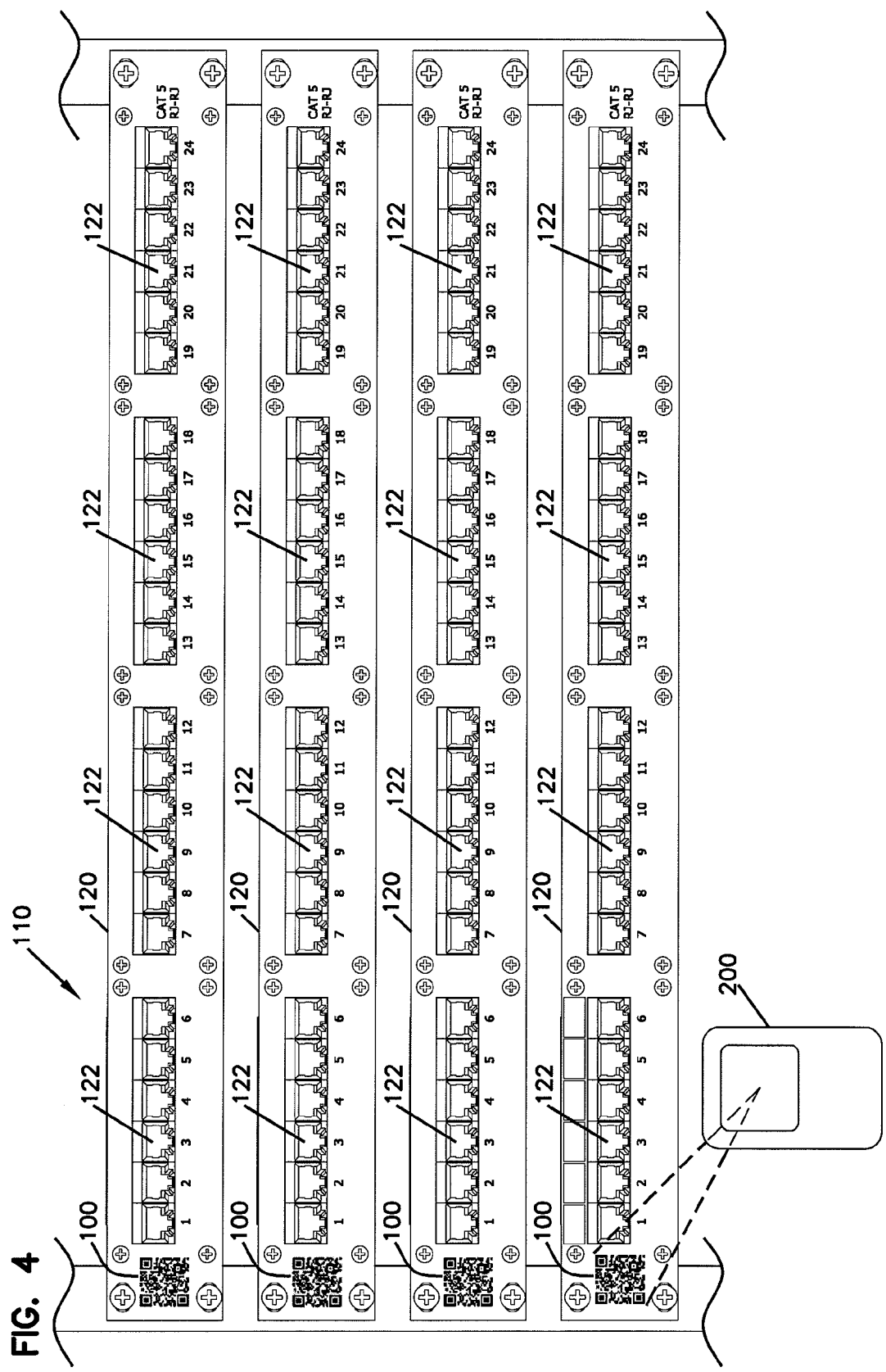

COMPONENT IDENTIFICATION AND TRACKING SYSTEM FOR TELECOMMUNICATION NETWORKS

This application is being filed on 8 Nov. 2013, as a US National Stage PCT International Patent application No. PCT/US2012/038152, filed 16 May 2012 in the name of ADC Telecommunications, Inc., a U.S. national corporation, and Tyco Electronics Raychem BVBA, a Belgium national corporation, applicants for the designation of all countries except the U.S., and, Trevor D. Smith, a citizen of the U.S., and Danny Ghislain Thijs, a citizen of Belgium, applicants for the designation of the U.S. only, and claims priority to U.S. patent application Ser. No. 61/487,178 filed on 17 May 2011 and U.S. patent application Ser. No. 61/591,576 filed on 27 Jan. 2012, the disclosures of which are incorporated herein by reference in their entirety. To the extent appropriate, a claim of priority is made to each of the above disclosed applications.

BACKGROUND

Telecommunication systems typically employ a network of telecommunication cables capable of transmitting large volumes of data and voice signals. The signals can be transmitted over relatively long distances in a wide area network or a local network. The signals can also be part of a data communications network, such as in a data center of a building or a campus. The telecommunications cable can include fiber optic cables, electrical cables, or combinations of electrical and fiber optic cables. A typical long distance telecommunications network also includes a plurality of telecommunications enclosures integrated throughout the network of telecommunications cables. The telecommunications enclosures are adapted to house and protect telecommunication components such as splices, splice trays, termination panels, power splitters and wave length division multiplexers. Data centers include telecommunications equipment, storage systems, power supplies, and other equipment.

SUMMARY

The present disclosure relates to providing identification elements (e.g., tracking elements, tracing elements, locating elements, etc.) on various telecommunication components provided within a telecommunication network, such as a fiber optic network or a copper network. Example passive identification elements include bar codes (e.g., 2d barcodes) and radio frequency identification (RFID) tags. In certain embodiments, RFID tags are preferred over bar codes because they typically allow for significantly more information to be included therein. In certain embodiments, bar codes can be used to direct technicians to interne links at which additional information of the type described herein is provided. In certain embodiments, identification elements can be provided on telecommunication components through an application downloaded to a mobile device, such as handheld device, by scanning the bar code. Such application on the handheld device can then be used to manage the network connections, change the network connections, or check the status of the network connections. Multiple handheld devices can be used and synchronized together with a central application, website, or network. One example bar code useful for reading information from a network device and linking to a management application is a QR code.

A telecommunications system comprises a telecommunications component; and an identifying element on the telecommunications component, wherein the identifying element includes at least one of: information about connectivity of the telecommunications component, information about the telecommunications component, a link to a website, or a link to an application for downloading to a handheld device for managing the information about connectivity of the telecommunications component.

A method of using a telecommunications system comprises providing a telecommunications component; providing an identifying element on the telecommunications component, wherein the identifying element includes at least one of information about connectivity of the telecommunications component, information about the telecommunications component, a link to a website, or a link to an application for downloading to a handheld device for managing the information about connectivity of the telecommunications component; and scanning the identifying element.

The above noted systems and methods can also be used with any supporting hardware, such as hardware which supports, houses, or checks the equipment, including frames, racks, screens, cameras.

The above noted systems and methods and as further described and claimed can also be used with any type of network (copper or fiber) and whether the network is localized, or used or a wide area. The systems and methods can be used by the system operator for the equipment, the connections, and/or the supporting hardware, as desired.

BRIEF DESCRIPTION OF THE FIGURES

FIG. 4 is an example telecommunications rack including the plurality of patch panels.

DETAILED DESCRIPTION

Figure 1:
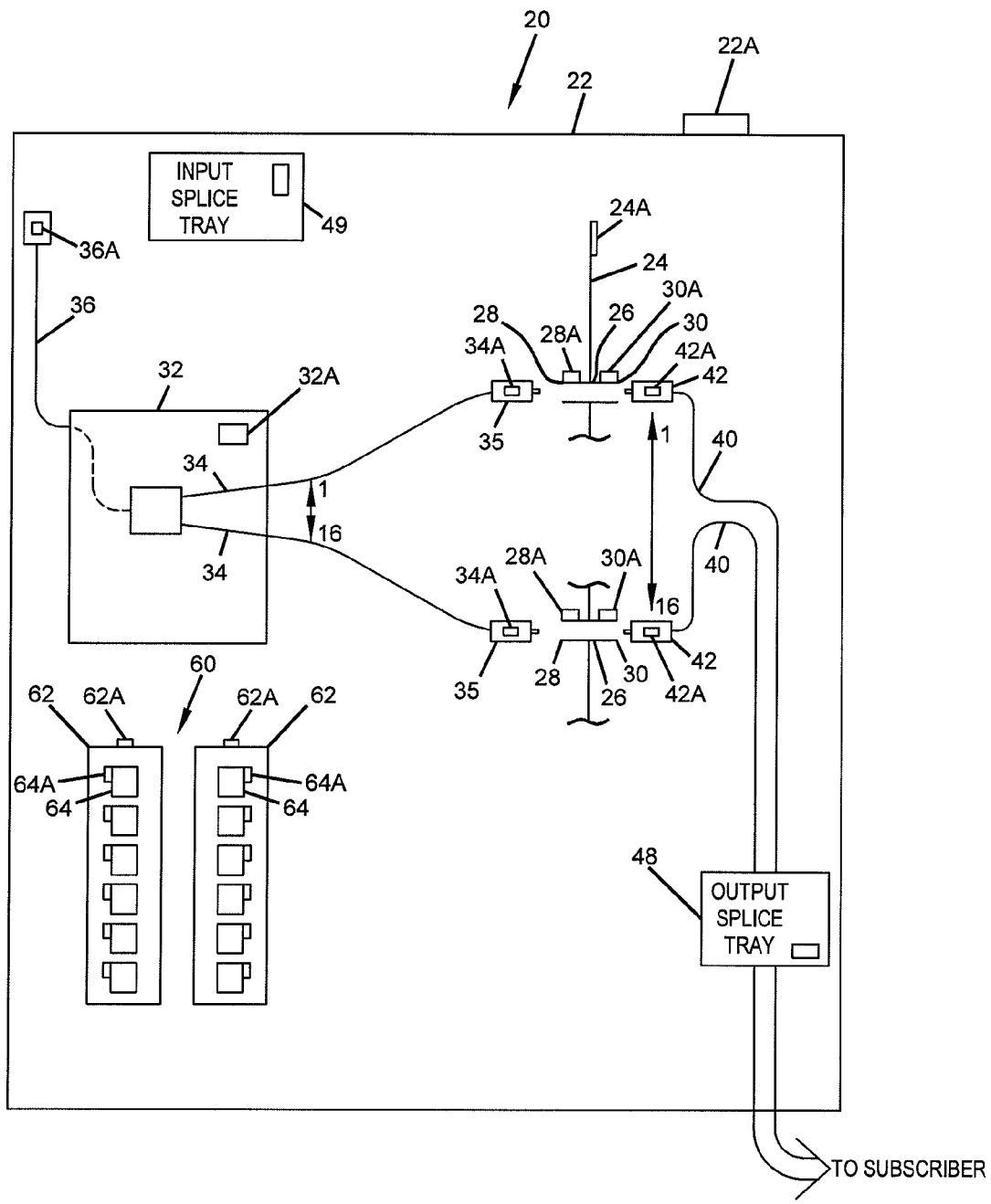
FIG. 1 is an example of a fiber distribution hub including a component identification system in accordance with the principles of the present disclosure.

Some telecommunication networks include a large number of components distributed over a large area. Often, the as-built configuration of a telecommunications network (e.g., a passive fiber optic network) differs from the configuration of the telecommunication network as originally planned. Because components of a given telecommunication network are spread out over a relatively large area, it can be difficult to track and confirm the as-built configuration of the telecommunications network. Similar problems exist in local networks, such as in data centers, where high density is desired.

The present disclosure relates to various systems and methods for maximizing the amount of data available for defining the as-built configuration of a telecommunication network. The present disclosure also relates to various methods and systems for utilizing as-built data to improve the reliability of telecommunication systems, to improve the ability to efficiently maintain telecommunication systems, and to improve the ability to efficiently upgrade telecommunication systems.

Certain aspects of the present disclosure relate to providing identification elements (e.g., tracking elements, tracing elements, locating elements, etc.) on various telecommunication components provided within a telecommunication network such as a fiber optic network or copper network. Example passive identification elements include bar codes (e.g., 2d barcodes) and radio frequency identification (RFID) tags. In certain embodiments, RFID tags are preferred over bar codes because they typically allow for significantly more information to be included therein. In certain embodiments, bar codes can be used to direct technicians to network links, such as internet links at which additional information of the type described herein is provided. In certain embodiments, identification elements can be provided on passive telecommunication components such as: splitter modules; fiber optic connectors; fiber optic adapters; individual fiber optic adapters provided at a termination region; termination panels themselves; power splitter modules; individual outputs of power splitter modules (e.g., either connectorized outputs or non-connectorized outputs); multiplexers such as wavelength division multiplexers; individual outputs of multiplexing devices; fiber distribution hub housings; adapters used to interconnect with plug and play splitters; drop terminals; individual ports corresponding to drop terminals; ruggedized connectors that plug into drop terminals or elsewhere; single fiber ruggedized connectors; multi-fiber ruggedized connectors; individual fiber optic splices; splice trays; splice enclosures; parking modules; individual parking ports; fiber optic trays and drawers; wall boxes; receptacles for receiving parking modules; MTP/MFC connectors; and/or on other structures. Identification elements can be provided on active component as well.

Example parking modules are disclosed in U.S. Pat. No. 7,809,233 which is hereby incorporated by reference in its entirety. An example network interface device is disclosed in U.S. patent application Ser. No. 11/607,676 which is hereby incorporated by reference in its entirety. An example single fiber ruggedized connector is disclosed at U.S. patent application Ser. No. 12/203,508 which is hereby incorporated by reference in its entirety. An example splice tray is disclosed at U.S. application Ser. No. 12/425,241 which is hereby incorporated by reference in its entirety. Example fiber optic drawer/trays are disclosed at U.S. patent application Ser. Nos. 12/840,834 and 61/378,710 which are hereby incorporated by reference in their entireties. Example fiber optic enclosures are disclosed at U.S. Pat. Nos. 7,715,679; 7,756,379; and 7,869,682, which are hereby incorporated by reference in their entireties. An example aerial splice enclosure is disclosed at U.S. patent application Ser. No. 12/350,337 that is hereby incorporated by reference in its entirety. Example plug and play splitters are disclosed at U.S. Pat. Nos. 7,376,322; 7,593,614; 7,400,813; 7,376,323; and 7,346,254, which are hereby incorporated by reference in their entireties. An example drop terminal is disclosed in U.S. Pat. No. 7,512,304, which is hereby incorporated by reference in its entirety. An example ruggedized multifiber connector is disclosed at U.S. Pat. No. 7,264,402, which is hereby incorporated by reference in its entirety. Example fiber distribution hubs are disclosed in U.S. Pat. Nos. 7,873,255; 7,720,343; 7,816,602; 7,728,225; and U.S. patent application Ser. No. 12/827,423, the disclosures of which are hereby incorporated by reference in their entireties. An example splice closure is disclosed in U.S. Provisional Patent Application Ser. No. 61/468,405, which is hereby incorporated by reference in its entirety. In accordance with the principles of the present disclosure, identification elements can be incorporated into the various components of the systems disclosed in the above-identified patents and patent applications.

FIG. 1 shows an example fiber distribution hub (FDH) 20 having a component identification element in accordance with the principles of the present disclosure. The fiber distribution hub 20 includes an outer housing 22. An FDH identifying element 22A is provided on the housing 22. In one embodiment, the identifying element 22A is an RFID tag or a bar code. In the case of an RFID tag, the RFID tag can include various embedded information such as a photo of the FDH, an installation manual, information regarding FDH accessories, reorder information, and a specific identifying number for identifying the particular FDH.

The FDH 20 includes a termination field/panel 24 supporting a plurality of fiber optic adapters 26. Each of the fiber optic adapters 26 includes first and second ports 28, 30. The termination field 24 has an identifying element 24A corresponding to the field as a whole. Additionally, each of the fiber optic adapters 26 includes identifying elements corresponding to each of the first and second ports 28, 30. For example, each of the first ports 28 includes its own identifying element 28A and each of the second ports includes its own identifying element 28A.

The FDH 20 also includes a splitter module 32 containing a splitting component, such as power splitter or wave length splitter components. The splitting module 32 has its own identifying element 32A. The splitting module 32 includes a plurality of outputs 34 (e.g., 16 pigtail outputs, 32 pigtail outputs, etc.). Each of the outputs 34 can include its own identifying element 34A. If the outputs 34 are connectorized, the identifying elements 34A can be provided on connectors 35 terminated to the ends of the outputs 34. If the outputs 34 are not connectorized, the identifying elements 34A can be provided directly on the pigtails routed out from the splitter module 32. The splitter module 32 can also include an input 36 which can have its own identifying element 36A. The input 36 can be connectorized or connectorized. In the case of a connectorized input, the identifying element 36A can be provided on the connector. It will be appreciated that the splitter module includes components for providing a one to many optical connection. In the case of a power splitter, a signal input to the splitter module 32 by the input 36 is split in power and divided equally to the various outputs 34. In the case of a splitting component in the form of a wave length division multiplexer, a signal input through the input 36 is split or divided based on wave length and signals within predefined wave length ranges are transmitted to the various outputs 34.

Referring still to FIG. 1, the FDH 20 also includes a plurality of optical fibers 40 having ends that are connectorized by connectors 42. The optical fibers 40 can be optically connected to various subscriber locations via distribution or drop cables. Each of the connectors 42 can include its own identifying element 42A.

It will be appreciated that the outputs 34 of the splitting module 32 can be plugged into the first ports 28 of the fiber optic adapters 26 and the connectors 42 corresponding to the optical fibers 40 can be inserted into the second ports 30 of the fiber optic adapters 26. In this way, the fiber optic adapters 26 are used to optically connect the outputs 34 of the splitter module 32 to the optical fibers 40. This allows subscribers to be optically connected to the fiber optic network.

In certain embodiments, the identifying elements corresponding to the fiber optic connectors can include various information about the connectors. Example information includes: a unique identification number; test results from final factory validation testing (e.g., end face geometry, insertion loss information, return loss information), warranty information, installation information, accessories information, re-order information, or other information.

In certain embodiments, the FDH 20 can include a splicing region 48 including one or more splice trays. Each of the splice trays can include its own identifying element. It will be appreciated that splices are held within the splice tray. It will be appreciated that each of the splices can have its own identifying element. Similarly, each of the fibers connected by a given splice can have there own identifying element. The splicing region 48 can be used to splice the fibers 40 to outgoing distribution cables routed to subscriber locations. A further splice region 49 can be provided for splicing the feeder fibers to the splitter inputs. Identifiers can be provided at each of the splice trays and can also be provided for each of the incoming and outgoing fibers routed to the spliced trays.

The FDH 20 also includes a connector storage location 60 having parking modules 62 with module identifiers 62A. The parking modules include ports/receptacles 64 for receiving individual connectors (e.g., connectors 35). The modules and each of the ports can include individual identifying elements 64A.

In practice, the FDH 20 is installed by a technician in the field. During the installation process, a technician can use a handheld scanner to scan the FDH identifying element 22A. The scanning element can also access positioning data (e.g., global positioning coordinates) corresponding to the location the FDH 20 is being installed. In this way, by scanning the FDH identifying element 22A, the exact geographic position at which the FDH has been installed can be saved and later downloaded into a database recording the as-built configuration of the telecommunications system. Scanning of the identifying element 22A can also provide the technician with necessary installation information, such as installation manuals or other materials. The scanning ties a unique identifying number assigned to the FDH 20 with a particular geographic position at which the FDH 20 has been installed. Information relating to the technician (e.g., identification, training record) can also be saved and linked to the given installation at the time of the scan.

As the technician continues the installation process, the technician plugs the outputs 34 into the first ports 28 and also plugs the connectors 42 into the second ports 30. During this installation process, the technician can scan the identifying elements 34A corresponding to the splitter outputs and the identifying elements 28A corresponding to the first port. In this way, information can be saved into the as-built database showing exactly which outputs 34 are plugged into exactly which first ports 28. Specifically, specific identifying numbers corresponding to each of the outputs 34 are tied to corresponding identifying numbers corresponding to each of the first ports 28. In certain embodiments, the identifying elements 34A and the identifying elements 28A are scanned separately. In other embodiments, the identifying elements 34A and the identifying elements 28A are required to be scanned together or can be scanned together to reduce the likelihood of error in the scanning process. In a similar way, the technician can scan each of the identifying elements 42A and each of the identifying elements 30A to record a record of exactly which connectors 42 are inserted into which second ports 30. In this way, identification numbers corresponded to each of the connectors 42 are linked to corresponding identification numbers corresponding to each of the second ports 30 so that an accurate as-built data base can be generated. Similarly, information linking specific storage ports 64 to specific outputs 34 can be scanned and saved.

In certain embodiments, the scanner/RFID reader can be a separate piece of equipment. In other embodiments, the scanner/RFID reader can be incorporated into a cellular phone or tablet, or can be an add-on to a cellular phone or tablet. Other information that can be recorded includes: the name of the technician conducting the installation; technician training records; and the time at which each operation was conducted.

Example information that can be included in the identification elements (e.g., RFID tags) which would be available to the customer/technician upon accessing the information on the identification element include:

Information List No. 1
Test results (IL, RL, geometry, etc.)
User manuals and videos
Re-order information
Ancillary products
Product pricing and availability
Warranty information
Product recall notices
Extended warranty offers
LSL information
Installation date and technician Scanning the identification elements can generate the following information:

Information List No. 2
Installation rates—actual consumption
End user information
Installation locations—GPS coordinates
Actual installer name and training records
Verify improper use of LSL items
Frequency of use/visit
Automated record keeping At least some of the information outlined above can be used for implementing product warranties. For example, warranties could be started by the product seller when the product is actually installed in the field. The information derived from the scanning operation can be used to confirm that all product was be installed by a certified installer and suitably scanned upon installation. Violation of this could void the warranty. An application (e.g., a Smartphone application) can be developed that verifies training records of installer, records installation location; determines installation rate used an input to demand prediction, as a locator for any warranty concerns; and to bring extended warranty information to customers as records indicate warranty runs out. Registered users can become part of a seller database of customer contacts—allows follow-up on ease of use.

The above-description includes an example implementation of component identification elements included in a fiber distribution hub (FDH) 20. Various other telecommunications equipment and cable management systems and networks are anticipated for use with one or more component identification elements. For example, the identifying elements can be utilized in a data center including an identifying element associated with each patch panel. Identifying elements can be associated with each port of the patch panel and each patch cord connected to the patch panel if desired. Fiber or copper cables can be used in the data center. One example copper patch panel is disclosed in U.S. Pat. No. 6,504,726 which is hereby incorporated by reference in its entirety.

Figure 2:
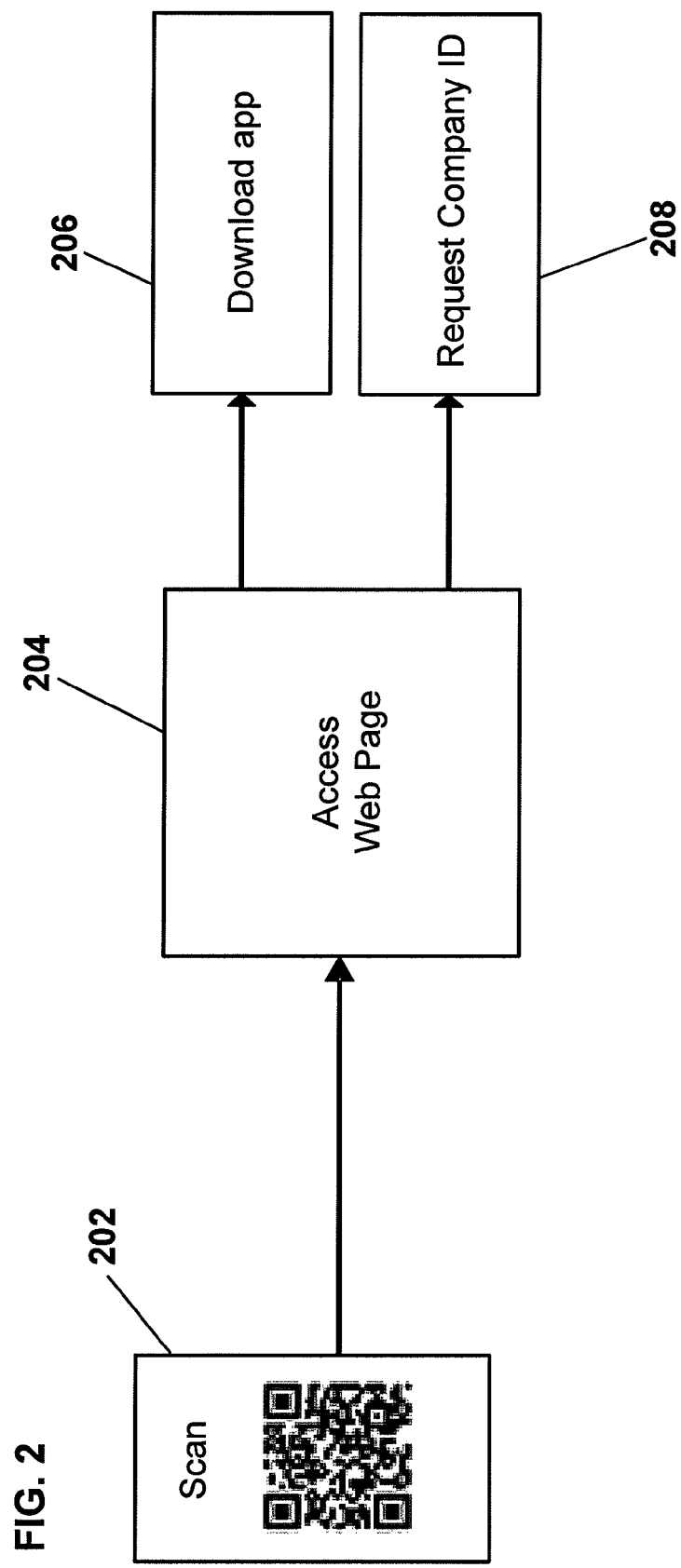
FIG. 2 shows steps for using a component identification element in one implementation of the present disclosure.

With reference to FIG. 2, one specific implementation of an identifying element, which is useful in a data center, on a fiber distribution hub, or in other telecommunications systems and networks, is a 2d bar code in the form of a QR code. The QR code can be scanned at step 202 by a handheld device (e.g., cell phone) by the technician, which can then direct the technician to a company's website at step 204. The company's website can be the product manufacturer's website or the user's website. The QR code can also link to one or more of the items in the Information List No. 1 above. The QR code could also be coded to include one or more of the items in the Information List No. 1 above.

The QR code can also direct the technician to download an application for use with the handheld device in managing the telecommunications equipment at step 206. At the same time the technician downloads the application, the technician can also request or enter a company identification code and/or user specific identification code at step 208. These steps are illustrated in FIG. 2.

Figure 3:
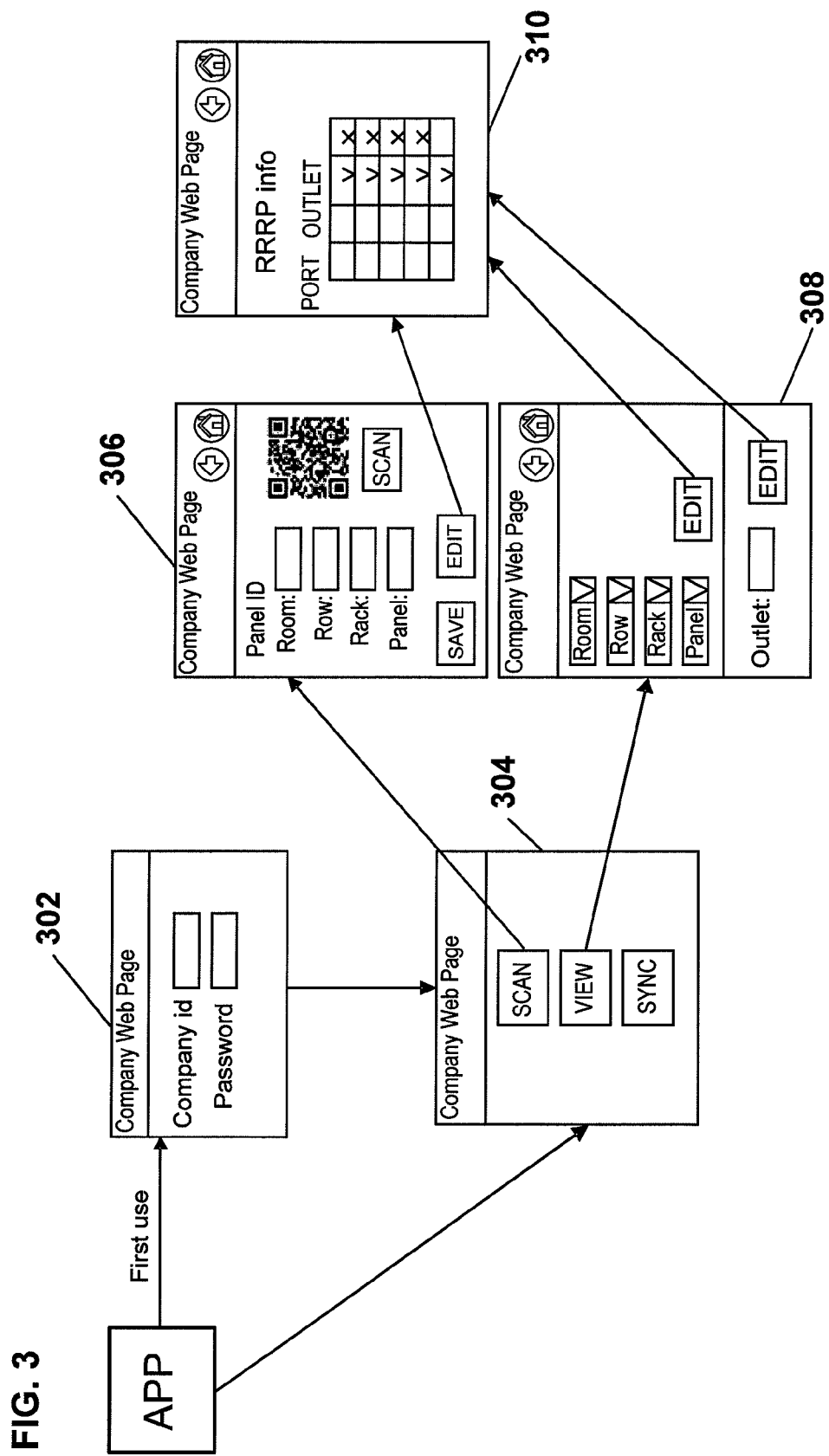
FIG. 3 shows various steps in additional implementations of the present disclosure using a component identification element.

Referring now to FIG. 3, once the handheld device includes the application, the QR code 100 of the network device (e.g., patch panel) can be scanned and the technician can enter the company ID, and the password if necessary, at step 302, to begin implementation of the application. If the handheld device is already linked to the user, the user can begin the application to manage the network device at step 304.

The QR code gives the technician a tool to maintain connection information for their network connections in a data center, such as the network connections between patch panels 120, of the type shown in FIG. 4. Instead of scanning all of the connections, the technician can enter them manually into the handheld device to document the network connections.

Each patch panel 120 will be labeled with a unique QR code 100. In one preferred embodiment, the QR code will contain a URL and a unique ID. The URL will bring the technician to a website where the technician can see installation instructions or other information about the network. The application will give the technician the possibility to maintain the port 122 connections for all the patch panels 120 adjacent to the scanned panel 120.

The first time that the technician starts the application, the application preferably requests a company identification and a password at step 302 of FIG. 3. Once the handheld device is linked to the website, the technician will be able to identify the panel at step 304. In one implementation, the panel information can include information such as: 1) a room number, 2) a row number, 3) a rack number, and 4) a panel number as shown in steps 306 and 308. Together with the unique ID, and the QR code of the panel, this information will be stored locally on the handheld device. This information can be uploaded to the network or main storage device.

At a later date, when the technician reads the QR code on the patch panel 120, the technician will see the port information on the handheld device. The port information can be updated if the technician makes a change in the connections between the ports 122 at step 310. Scanning the QR code and/or updating the information can update the items in the Information List No. 2 above.

In one application, the technician can view existing connections between ports 122 to make a manual check and verification of the connections.

The technician can also synchronize the handheld device with other handheld devices and also to the home network database so that the full network information is current.

A further application of the component identification and tracking system for telecommunication networks includes situations where internet and/or cell service is unavailable. The technician can utilize the QR code to access information stored on a handheld device. If the technician then makes changes to the network connections, the information can be entered on the handheld device and later synchronized with the main network or other handheld devices for updating the main database.

A still further application of the present invention includes situations where the QR code includes the actual connection data of the network connections. Such information might be useful when there is no internet or cell coverage where the technician is accessing the network. If the technician reads the QR code and reads the network connections, the technician is able to see a current status of the network connections. If a change is made by the technician, the technician can enter the change on the handheld device, and print out a new QR code on a portable printer. The new QR code is left on the network device, and the previous code is removed or covered up since it is now out-of-date. In this manner, a technician can access network information merely by reading the QR code, and updating the QR code to reflect changes.

Within the present invention, various passive identification elements can be utilized including the noted barcodes and the radio frequency identification (RFID) tags. Barcodes can be one dimensional or two dimensional. More information is capable of being stored on the two dimensional bar codes, such as the noted QR codes. The information can be transferred to other network devices for network management, especially for larger networks where multiple technicians may be managing the network connections.

Parts List
20 fiber distribution hub
22 outer housing
22A identifying element
24 termination field/panel
24A identifying element
24 splitter module
26 fiber optic adapters
28 first ports
28A identifying element
30 second ports
30A identifying elements
32 splitter module
32A identifying element
34 outputs
34A identifying element
35 connectors
36 input
36A identifying element
40 optical fibers
42 connectors
42A identifying element
48 splicing region
49 splice region
60 connector storage location
62 parking modules
62A module identifiers
64 ports/receptacles
64A individual identifying elements
100 identifying element
110 data center
120 patch panel
122 port
200 handheld device
202-208 initiation steps
302-310 usage steps

The invention claimed is:

1. A communications system configured to carry communications signals over a communications network, the communications system comprising:
 a communications component of the communications network;
 an identifying element disposed at the communications component; and
 a mobile device that is configured to scan the identifying element;
 wherein the identifying element includes information about connectivity of the communications component, information about the communications component, a link to a website, and a link to an application for downloading to the mobile device for managing the information about connectivity of the communications component;

wherein the mobile device also is configured to communicate the information about connectivity to the management network.

2. The communications system of claim 1, wherein the identifying element is an RFID tag.

3. The communications system of claim 1, wherein the identifying element is a bar code.

4. The communications system of claim 3, wherein the bar code is a two dimensional barcode.

5. The communications system of claim 4, wherein the two dimensional barcode is a QR code.

6. The communications system of claim 1, wherein the communications component is configured to receive an optical fiber that carries the communications signals.

7. The communications system of claim 1, wherein the communications component is configured to receive an electrical cable that carries the communications signals.

8. The communications system of claim 1, wherein the communications component includes a plug connector.

9. The communications system of claim 1, wherein the communications component includes a structure defining a port to receive a plug connector.

10. The communications system of claim 1, wherein the information about the communications component includes test results.

11. The communications system of claim 1, wherein the information about the communications component includes user manuals.

12. The communications system of claim 1, wherein the information about the communications component includes reorder information.

13. The communications system of claim 1, wherein the information about the communications component includes product pricing and availability.

14. The communications system of claim 1, wherein the information about the communications component includes warranty information.

15. The communications system of claim 1, wherein the application for managing the information enables a user to manually enter network connections made at the communications component.

16. The communications system of claim 1, wherein the mobile device is configured to locally store information obtained from scanning the identifying element and to communicate the information about the connectivity to the management network at a subsequent time.

* * * * *